United States Patent [19]

Zonneveld et al.

[11] 3,829,844

[45] Aug. 13, 1974

[54] INTERROGATION APPARATUS AND METHOD INCLUDING A RECORD CARRIER FOR STORING IMAGES WITH ADDRESSES

[75] Inventors: Frans Wessel Zonneveld; Johannes Westhof, both of Emmasingel, Eindhoven, Netherlands

[73] Assignee: U.S. Philips Corporation, New York, N.Y.

[22] Filed: June 1, 1973

[21] Appl. No.: 366,092

[30] Foreign Application Priority Data

June 10, 1972 Netherlands .......................... 7207935

[52] U.S. Cl. .............................................. 340/172.5
[51] Int. Cl. .............................................. G06f 3/00
[58] Field of Search .................................. 340/172.5

[56] References Cited

UNITED STATES PATENTS 3,566,365 2/1971 Rawson et al. .................. 340/172.5
3,566,370 2/1971 Worthington et al. ........... 340/172.5

*Primary Examiner*—Raulfe B. Zache
*Attorney, Agent, or Firm*—Frank R. Trifari

[57] ABSTRACT

A record carrier which is suitable for the storage of image information in the form of questions, and an interrogation apparatus in which the image information can be displayed in individual images. The record carrier comprises one an address location with an address for each image, so that the image is identified. The answers to questions are recorded on a recording medium in the interrogation apparatus, in combination with the address of the question image. This recording medium is used in a computer system, the combination of address and answer being a storage address of the computer store. The images of the record carrier can furthermore be provided with a type indication which indicates types of questions.

9 Claims, 9 Drawing Figures

PATENTED AUG 13 1974 3,829,844

SHEET 2 OF 4

INTERROGATION APPARATUS AND METHOD INCLUDING A RECORD CARRIER FOR STORING IMAGES WITH ADDRESSES

The increasing number of computer applications is accompanied by an increased demand for data input apparatus. Attention is focussed particularly on off-line apparatus for the collection of data which can subsequently be processed in a computer system. In cases where these data consist of answers to questions, there are two important aspects:

the apparatus must comprise means on which the questions can be made visible, and the answers must be recorded with a reference to the questions, so as to enable the correct relations to be established during the processing in a computer system.

The questions can be made visible by means of a film (preferably in a cassette,) which is projected on a screen in the apparatus. Each film image can contain a question or group of questions and also other graphic information, the film being stationary during the projection of such a question or group of questions.

The invention relates to a record carrier which is suitable for the storage of image information which can be made visible in an off-line interrogation apparatus in individual images by means of display means, the interrogation apparatus comprising operating means for the input of answers to questions and recording means for the recording of the answers together with a reference to the questions.

The record carrier may be a film, but also a video tape or video disc or even a carrousel containing slides. The said referencing of the answers to the questions constitutes a problem in known techniques, particularly if the requirement of off-line operation is to be satisfied. In on-line equipment (directly coupled to a computer system) a program is required to ensure that identification data are processed in the question/answer procedure: the transport of the record carrier is controlled by the computer system and the (film) images are counted down on a counter. The position of the counter identifies the question or group of questions. The answer or the answers are recorded (in coded form) together with said counter position, for example, on a magnetic tape. Sufficient precautions must then be taken to ensure that the counting down is correctly performed: special safety measures are necessary to ensure that the correct answer remains with the correct question. This tape is subsequently used to input the data (questions + answers) in a computer system for further processing. The described on-line operation has other drawbacks also for this kind of equipment, such as: when a plurality of interrogation qpparatus are connected to a computer system, this system will have to operate on a time division basis; the occupation of a computer for often very long interrogation procedures is an expensive matter; a communication network must be available in the case of long distances between the interrogation equipment and the computer, etc.

Off-line interrogation equipment which does not incorporate the drawbacks of the on-line equipment is also known, notably equipment which utilizes slides in a carrousel as the question carrier. The position of the carrousel is a direct indication of the presented question or group of questions, and can be readily recorded on a recording medium together with the answer. A suitable example in this respect is a punched card: the punching mechanism or the card is coupled to the carrousel movement, so that the card column numbers correspond to the slide numbers. The answers can then be punched in the relevant columns. However, a slide carrousel of this kind has major drawbacks: it requires much space and its capacity is limited. Moreover, a punched card mechanism is also robust and makes the interrogation apparatus difficult to handle and annoyingly noisy. The use of a tape-like record carried in the form of a film or video tape is, therefore, much more attractive, but in such an off-line apparatus the said referencing between question and answer constitutes an additional problem: each apparatus must then incorporate a counter for the image numbers and the necessary safety measures to ensure that referencing is effected correctly. This is because the risk of an answer being recorded with a different question must be precluded (notably in medical applications of this equipment).

In order to solve the said problem and to realize an off-line interrogation apparatus using tapelike or disclike record carriers without making this apparatus too complex and difficult to handle, the record carrier according to the invention is characterized in that, at least per part of the record carrier, the record carrier comprises an address location with an address per image, an image thus being identified, it being possible to record this address, in combination with an answer to a relevent question, on said recording means.

Absolute addressing is thus achieved, which precludes mix-ups and which is easy to handle. The address code can notably be a code which can be optically detected (on film) or a magnetic pulse code on a magnetic disc or tape (video).

An off-line interrogation apparatus which is adapted to the use of a record carrier according to the invention, comprising display means for the display of image information in individual images, further comprising operating means for the input of answers to questions, and recording means for the recording of the answers together with a reference to the questions, is characterized in that the interrogation apparatus comprises address detection means for the detection of the address of an image which is presented for display, it being possible to record the detected address in combination with the answer to a relevant question on a recording medium by means of the recording means.

According to a further aspect of the invention, images of the record carrier can also contain an address of another image besides the said image identifying address. When such an image is projected and the addresses are detected, it is thus possible to establish the address of a next image already. An off-line interrogation apparatus which is suitable for such a record carrier is characterized in that it comprises additional address detection means for the detection of said addresses of other images, and address selection means for the selection of said other images.

It is to be noted that record carriers for interrogation equipment can be provided with a code which can be referred to as type code. This is not an absolute address code, but a code which consists, for example, of only 1 or 2 bits and which serves to distinguish types of questions or groups of questions on the individual images. For example, using only 1 bit, a distinction can already be made between principal questions and sub-(= detailed) questions. Using such a code on a question record carrier in an interrogation apparatus, a changeover can be readily made at a given point of an interregation, directly or as a result of an answer, to another type of question or group of questions. When such a type of coding is used with the record carrier and the interrogation apparatus according to the invention, an additional advantage is obtained because no matter how the change-overs from type to type (and back), the presence of absolute addresses ensures that there can never be uncertainty during recording as regards which answer belongs to which question. Consequently, according to this aspect the record carrier according to the invention is also characterized in that images of the record carrier are also provided with a type indication for groups of images, different types of image information thus being identified. So as to enable the use of this record carrier, the interrogation apparatus according to the invention is also characterized in that it comprises type detection means for the detection of the type indication on the record carrier and type selection means for selecting an image having a type indication on the record carrier. If such a type indication appears as an answer to a question, a next image can be automatically selected. So as to achieve this object, the interrogation apparatus according to the invention is characterized in that type indication generating means are provided by means of which the type indication of a new question or group of questions can be generated on the basis of at least one answer to a question, the image having the relevant type indication being selectable on the record carrier by means of the type selection means.

The record carrier having the address code per image also offers another possibility for an associated interrogation apparatus. For example, by means of buttons an arbitrary address of an image can be introduced, with the result that the question or group of questions of this image is selected for projection. It is thus possible to start at any arbitrary point of an interrogation procedure or to fetch an arbitrary desired image from the record carrier at any instant. So as to realize this, the off-line interrogation apparatus according to the invention is characterized in that it comprises input means for the input of an image address and address selection means for selecting the image having this address from the record carrier by means of the address detection means.

However, this aspect extends further yet: starting from a given question or group of question, a plurality of alternatives exist on the basis of the answer thereto. An answer to a question can change the address code of this question such that a new address for a next question or group of questions is formed, by means of which the image having the corresponding address code can be selected. Besides changing by way of the type indication, changing by means of answers is thus also possible by formation of absolute addresses of other images. The combination of these two aspects offers a very flexible system, by means of which all kinds of interrogations can be performed. For example: the answering of a principal question can cause: (1) the fetching of associated subquestions (with type coding) (2) the fetching of a principal question $x$, (3) the fetching of a principal question $y$ etc. Considering the foregoing, the interrogation apparatus according to the invention is also charcterized in that address generating means are provided by means of which the address of a new question or group of questions can be generated on the basis of at least one answer to a question, the image of the record carrier having the said address being selectable by means of the address selection means.

The use of the relevant interrogation equipment will generally also involve a need for recording an additional quantity of analog or other information, for example, at the end of an interrogation. An example in this respect is speech. According to a further aspect yet, an interrogation apparatus according to the invention is also characterized in that means are provided for recording arbitrary information as an answer to a question in the recording medium, an identification code which can be supplied by an identification code source being associated with said arbitrary infromation so that an identifyable combination of said code and arbitrary information is produced.

It is to be noted that an interrogation system comprising a computer system and at least one interrogation apparatus and record carrier according to the invention is characterized in that an address of an image of the record carrier, combined with the answer to a relevant question and recorded on the recording medium, contains a reference to a storage address in the store of the computer system, information for the further processing of the answer to the relevant question being present at said address. The processing of the answers is thus automated. For example, the answer to questions can be directly supplied by the computer system in the form of a report. Present at the selected addresses in the computer store are complete sentences, parts of sentences, and words which represent an opinion judgement etc. in a normal language which may be a language other than the language of the questions. These sentences, for example, are printed on paper and can be directly used. This form of standardized reporting is very fast and requires virtually no human intervention.

The applications are numerous: particularly medical applications (the recording of medical case history etc.), educational applications (programmed instructions and the recording of study results), the directed gathering of information according to a logic diagram for the benefit of statistical processing (enquiries!). The storage locations of the computer store will then contain instructions which indicate what is to be done with the answers. For example, add an answer to the answers to the same question from a plurality of persons etc. Another important application is the supervision of analytic and diagnostic tasks according to a logic diagram, including the recording of the observed facts (fault-finding, chemical analysis, medical diagnostics).

The invention will be described in detail hereinafter with reference to some embodiments according to the invention.

Figure 1:
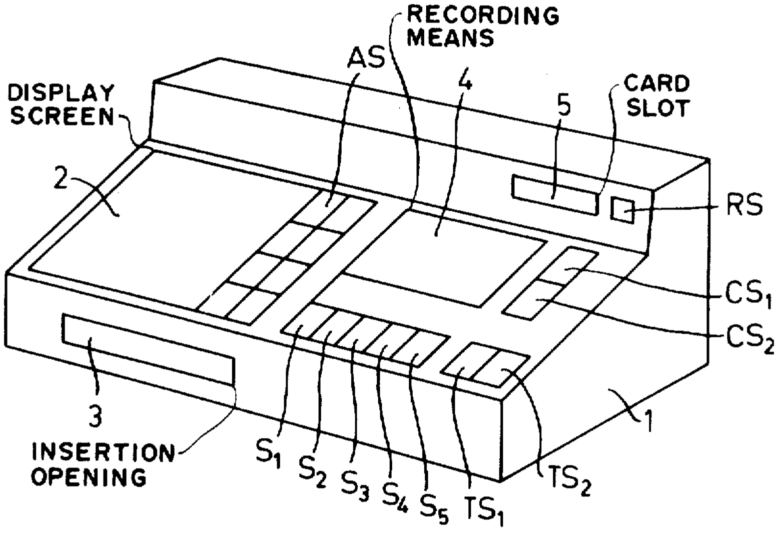
FIG. 1 shows a feasible off-line interrogation apparatus.
Figure 2:
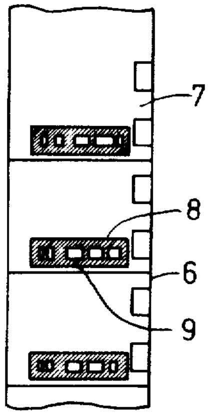
FIGS. 2, 3 show record carriers according to the invention.

FIG. 1 shows a feasible construction of an off-line interrogation apparatus according to the invention. The reference 1 denotes a housing accommodating a display screen 2, a record carrier insertion opening 3, recording means 4, and switches AS, S1, S2, . . . $S_5$, $TS_1$, $TS_2$, $CS_1$, $CS_2$ and RS. Also provided is an opening 5 in which a punched card or an indentification card can be inserted. The operation of the apparatus will be described hereinafter with reference to the FIGS. 2, 3 and 4. It is to be noted that switch $CS_2$ serves for lifting a cassette out of the recording means 4. FIG. 2 shows an embodiment of a record carrier 6 for the storage of image information in the form of questions (test and/or also other graphic information). This record carrier is a film which comprises film images 7. The record carrier can also be magnetic tape or a magnetic disc, the image information of which can be made visible by means of video techniques. Optical discs are also possible. Each image 7 comprises an address location 8 in which an address 9 is provided. In the case of a film, this can be binary black/white code which provides each image with an absolute identification. Many code techniques are known per se which are suitable for use in this case. Assume that in this example there are 13 bit locations for each address, so that there are $2^{13}$ = 8,182 images to be identified. If a 0 or a 1 (for example, white and black, respectively) can be accommodated on each millimetre, a vacant location remaining at the starting edge and at the end edge of the address location 8, the address codes are 1011100010001; 1011100010010; 1011100010011, respectively, in this example.

Figure 3:
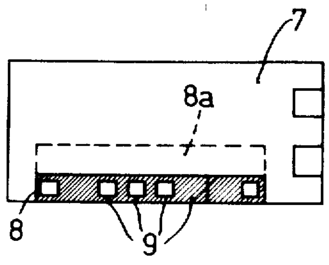

FIG. 3 also illustrates that in another case a special box is reserved, by way of example, for each bit of an address code 9 in address location 8. Many variations are possible. Moreover, a shown address location can be extended or another address location can also be present (location 8*a*, denoted by broken lines) in whch the address of another image is present. It is to be noted that such a code can also comprise locations for parity bits. Because these are not relevant to the actual invention, we will not elaborate on this subject.

The number of images which can be accommodated on a record carrier can be very large. If each image must have a complete absolute address, this may give rise to practical objections. Consequently, it is an obvious solution to divide such a record carrier into a number of parts. For example, a super 8 mm film is divided into 20 parts, each part constituting a complete (interrogation) question program.

The address location of each image comprises an address by which an image is fully identified within the part of which the image constitutes a sub-part. In such a case each part has an absolute part number, and each part starts with a starting image which is recognizable as such and which carries the relevant part number as its address in its address location. The images within such a part need not be provided with this part number in that case. The part number of a starting image is retained as a part number during an interrogation program and for each image the image address of such an image is recorded on a recording medium, together with an answer to a relevant question.

Such a high-capacity record carrier thus utilizes an hierarchic address composition, with the result that it is not necessary to record an extensive address for each image. If a further division yet of a record carrier is desired, an hierarchic address composition at more than two levels is alternatively possible in a similar manner. The collection of starting images can be recognizable as such by making use of a starting-image type-indication.

Figure 4:
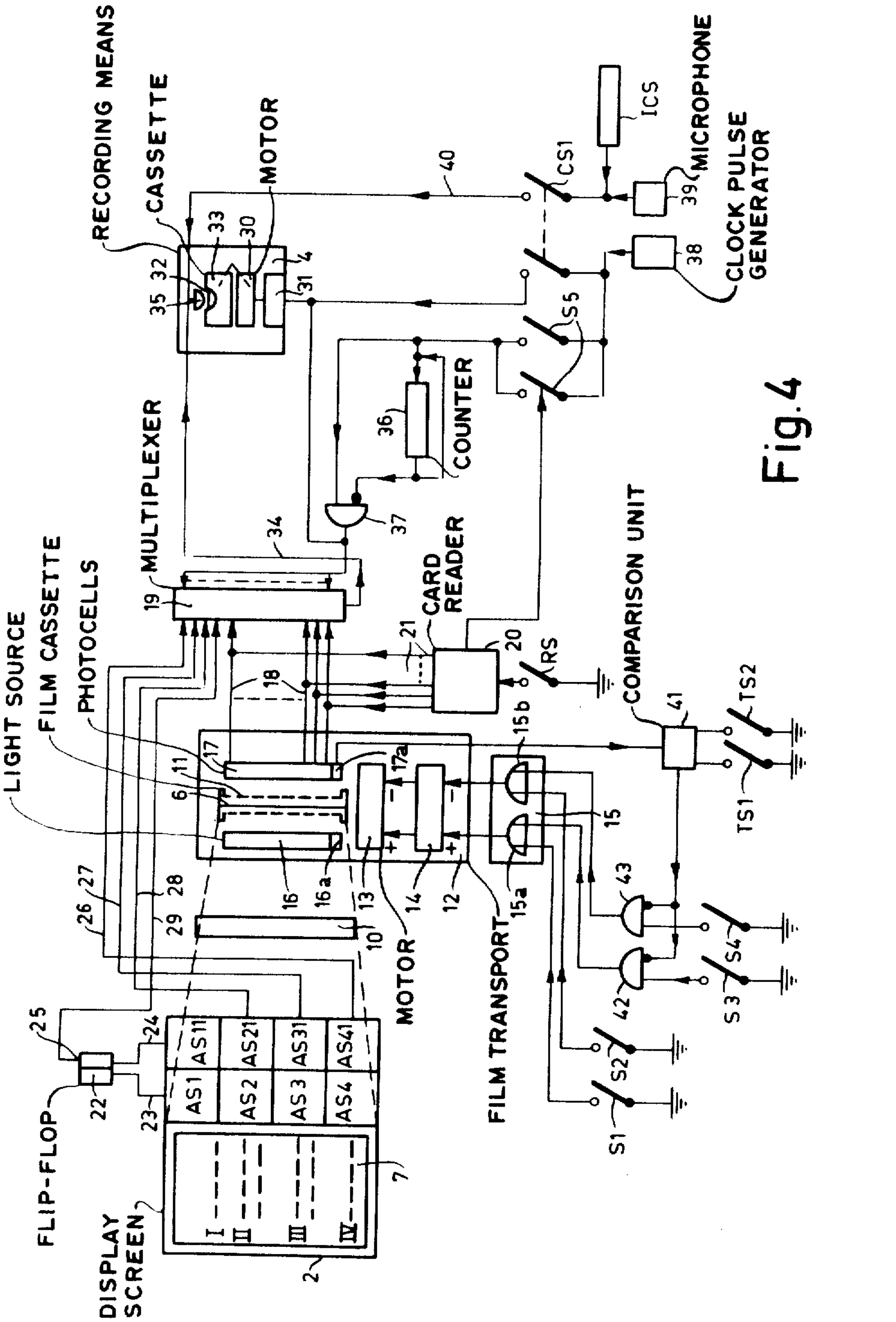
FIG. 4 shows a circuit diagram of an interrogation apparatus according to the invention.

FIG. 4 shows a circuit diagram of an interrogation apparatus for use with the described record carriers. The display screen 2 is shown again. An image 7 of the film 6 is projected on the screen 2 by means of display means 10. In this case the image comprises a groups of questions I, II, III and IV. In this example the film 6 is stored, for example, in a film cassette 11. This film cassette can be placed in a film transport unit 12 via the insertion opening 3 (FIG. 1). This unit 12 comprises a motor 13 and a motor power supply unit 14. The motor is capable of rotation in one (+) or the other (−) direction. This assembly (13, 14) is controlled by means of a film transport control unit 15 which comprises OR-gates 15*a* and 15*b*. The commands for this control unit 15 are provided by switches $S_1$, $S_2$, $S_3$ and $S_4$, which will be described in detail hereinafter. Provided at the film transport unit is an arrangement for the detection of the addresses 9 of the images 7. Detection can, of course, also be performed at other locations, for example, behind display means 10. A light source 16 and photocells 17 are used as the address detection means. There are at least as many photocells 17 as there are address code bits. The detected address code 9 is applied to a multiplexer 19 via conductors 18. Also shown is a card reader 20 with the switch RS, the outputs 21 being coupled to conductors 18 and connected to the multiplexer 19. This will be described in detail hereinafter. Eight answer switches are shown: switches AS1 and AS11 as the switches for two possible answers to question I, switches AS2 and AS21 as the switches for two possible answers to question II, etc. for switches AS3 and AS31 and AS4 and AS41.

If an image 7 of record carrier 6 comprises less than four questions, the relevant switches can remain unused. The essence is that an answer to a question becomes available as an answer code (0 or 1). This can be realized, for example, as follows: the pushbutton switches are connected to inputs of flip-flops. This is shown only for AS1 and AS11: AS1 is connected to a set input 23 of flipflop 22 and AS11 is connected to a reset input 24 thereof. If none of the switches is depressed, a O-signal is present on the output 25. This will occur if there is no question to be answered. When the question I is answered, either AS1 or AS11 will be depressed, and either a 1 appears on output 25 or a 0 remains/appears. The result is applied to multiplexer 19 via line 29. The same happens with the answers (or no answers if there is no relevant question) which are given to questions II to IV. The 0-bits or 1-bits are applied to the multiplexer via the relevant lines 26, 27 and 28.

Example: assume that there are questions I and II, and that the answer "no" is given to question I via AS11, and the answer "yes" is given to question II via AS2; in that case the coded answer result applied to the multiplexer 19 is 0100.

The interrogation apparatus also comprises the recording means 4. A motor 30 and power supply 31 serve for driving a magnetic tape 32 which is used as the recording medium and which is stored in a cassette 33. The information which is supplied from the multiplexer 19 via conductor 34 is transferred to the tape 32 by means of a magnetic head 35. A switch S5 controls the assembly 4 as well as the transport of information from multiplexer 19 to the recording means 4. Also used in this respect are a counter 36 and an AND-function gate 37. The reference 38 denotes a clock pulse generator and the reference 39 denotes a microphone by means of which, via switch CS1 and conductor 40, audio information can be recorded on the tape 32.

Finally, this embodiment of an interrogation apparatus incorporates steps which enable the use of a record carrier which is provided with a type indication in addition to the address code. It is feasible, for example, that the last bit location of the address location 8 of the film images 7 of film 6 (FIG. 2 or 3) is reserved for type indication. For example, 0 = principal question, 1 = sub-question or group of sub-questions. The steps taken in the interrogation apparatus so as to enable the use of a record carrier of this kind are: a suitable light source, in this case 16 extended by 16*a*, for the illumination of the type code, and one (or more, depending on the number of type code bits) photocells 17*a*, the 0-signal or 1-signal of which is applied to a comparison unit 41. Also provided are switches S3 and S4, gates 42 and 43 and switches TS1 and TS2 in order to enable operation with the type indication. This will be described hereinafter.

The operation of the interrogation apparatus is as follows: assume that a film cassette 11 has been placed in the film transport unit 12. Disregarding a user identification which will be described further on, an interrogation will start with a starting question, for example, a principal question. The user will then operate a type indication switch, for example, TS1, by means of which the type code for a principal question is set (assume bit code 0). This code is applied to the comparison unit 41. The user furthermore operates the switch S3 which serves to apply a command to the film transport unit 15 via the AND-gate 42. This command is applied to the forward input (+) of supply unit 14 via the OR-gate 15*a*, with the result that the motor 13 starts to rotate in the direction +. The film is transported and the address code and type code present on each image are detected by means of the detection means 16, 16*a* and 17, 17*a*. The type code from photocell 17*a* is compared with the adjusted type code in the comparison unit 41. If both codes correspond (in this case both 0), a signal appears on the output of 41. This signal is applied to the gates 42 and 43 in inverted form (denoted by a dot). Gate 42 was conducting (switch S3 closed, and no signal on the output of 41, but is now blocked. This means that there is no longer a command for control unit 15, as the motor 13 stops. A film image containing the (first) principal question is now present for projection. The user sees the question on the screen 2 and can give an answer thereto.

This answer can be given by means of a button AS1 or AS11. (It can be separately stated in the image which answer is to be given by means of which button. The buttons can alternatively be provided with an indication (for example, "Yes" or "No") so that the user sees which button is associated with which answer). The result is a 0 or a 1 on conductor 25 (see above), The following is then available in the multiplexer 19: (1) the address code of the projected image, i.e. of the relevant principal question, and (2) the answer to this question (in this case 1000 for "yes ", and 0000 for "no"). The multiplexer comprises a register which stores both codes: the register comprises as many stages as there are address and answer code bits; these bits are written in parallel.

The multiplexer can furthermore comprise parity bit generation means for protection of the codes, but this will not be described herein as it is of no essential importance to the invention. If the user agrees with the answer he has given, he can have this answer recorded by operating switch S5. The following then takes place: clock pulses from generator 38 are applied to the counter 36 and the gate 37. As long as the counter 36 has not reached its end position, its output (upper left) carries a 0-signal which is applied to AND-gate 37 in inverted form. Consequently, this gate 37 allows passage of clock pulses. These clock pulses are applied to the multiplexer 19, with the result that the register, now operating as a shift register, is emptied via conductor 34. The bits of the address and answer codes are recorded on tape 32 by means of the magnetic head 35. During the emptying of 19 the tape 32 is advanced via gate 37 by means of the same clock pulses which drive the register. This is because the pulses from gate 37 arrives in supply unit 31 which thus supplies a supply voltage for the motor 30. When the counter 36 reaches its end position, gate 37 is blocked and the recording process is stopped. The counting capacity of the counter is equal to the total number of bits which can be stored in the multiplexer at one time, i.e. the number of address bits + andwer bits (+ any parity bits), reduced by one. The latter is necessary to enable the overflow bit from the counter (counter = full) to serve also for setting the counter to the 0-position.

The user can then proceed to a next question. In this example as follows: operation of switch S1 ensures that via gate 15*a* of control unit 15 a brief command is given for transporting the film in the direction +: the next image is offered for projection. The remainder of the procedure is the same as above. There can be a plurality of questions for which a plurality of buttons of the group AS must be operated. In that case a given answer code appears which is recorded together with the image address code by operation of S5.

If the user wishes to go back to a previous image, he can do so by operating switch S2, Via OR-gate 15*b* the command for film transport in the direction - is given, i.e. in this case one image backwards. The answers then given, which may be different from the answers previously given with this image, are recorded again. In the processing of the data of the recording medium in the computer, steps will be taken to ensure that always the last answer given to a question or group of question is considered to be valid.

During the answering of given questions it may be desirable to go back to a previous principal question. This can be effected as follows: the operator coperates switch TS1 and switch S4. Via gate 43 and 15b, the supply unit supplies a voltage for transporting the film in the reverse direction (−). The type indication of the passing images is compared in comparison unit 41 with the type indication introduced by means of TS1. As soon as equality is detected, gate 43 is blocked and the film transport is stopped. The previous principal question is then projected again. The same can also be done for fetching sub-questions. The next sub-question or group of sub-questions can be fetched by means of switches TS2 (sub-question type indication) and S3, and the previous sub-question or group of sub-questions can be fetched by means of switches TS2 and S4.

The described unit also offers the possibility of recording arbitrary information: operation of switch CS1 provides connection of, for example, a microphone 39. Speech can then also be recorded on the tape 32. CS1 is a double switch, because it also serves to connect the clock pulse generator 38 to the supply unit 31. The motor 30 is thus supplied with a voltage during this audio recording, so that the tape 32 is transported. In addition to audio information, other analog or digital information such as measuring data etc., an be introduced and recorded. In order to ensure that during the further processing of this random information in a computer system this information is indeed recognized as additional random information, this random information is provided with an identification code. When the switch CS1 is closed, an identification code source ICS is connected to conductor 40, so that the identification code, characteristic of the random information to be added, is recorded on the recording medium 32 prior to this random information. An identifyable combination of said code and random information is thus obtained, like the described combination of addresses and answers to relevant questions.

With apparatus of this kind it is desirable that the user identifies himself before the procedure is started. A user identification must be recorded on the tape 32. This is effected in this case by means of a punched card reader 20. The user inserts a punched card and operates the switch RS. The punched card code is read and is supplied to the multiplexer via conductors 21. The reader 20 also applies a pulse to switch S5, so that the user identification can be recorded in the same manner as described above for the address code and answer code.

Figure 5:
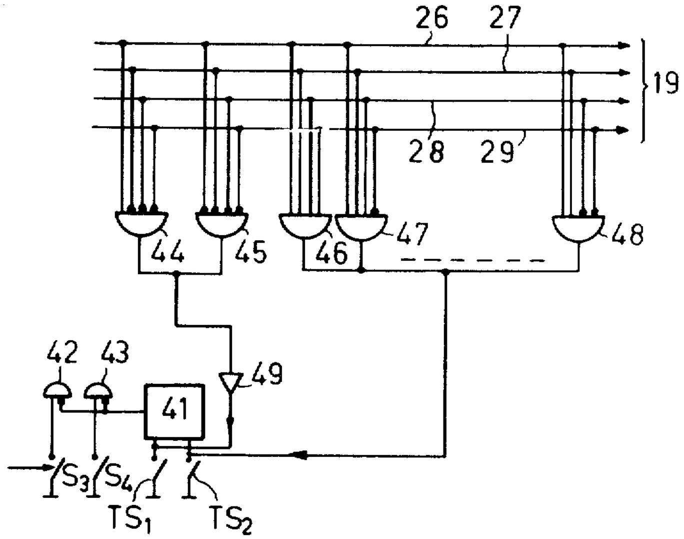
FIG. 5 shows an elaborated detail of the diagram of FIG. 4.

FIG. 5 shows an elaborated detail of FIG. 4.

In the described interrogation apparatus it is possible to determine, on the basis of answers to questions, what type of subsequent questions must follow. For example, if the answer to a first question of an image is "yes" and the answer to all other questions of this image is "no", the next principal question must be fetched (the answer code is then 1000). A plurality of combinations are thus feasible for the requirement to fetch a next principal question; for example: there is a fourth question only if the answer thereto is "no". (The answer code is then 0000). These examples are elaborated in FIG. 5: the inputs of AND-gates 44 and 45 receive the signals on lines 26 to 29, i.e. for 44: direct, inverted, inverted and inverted, so 1000 → 1111, and for 45: all inverted, so 0000 → 1111. The AND-gate 44 supplies a 1-signal if the condition 1000 on lines 26 to 29 is satisfied, and applies this 1-signal, after inversion in 49, as a 0-bit (= principal question type code) to comparison unit 41. The same applies to gate 45 which supplies a 1-signal if the lines carry the code 0000. The remainder of the fetching procedure is the same as described above for the operation of switch TS1. Internal steps are taken yet such that the switch S3 is conducting during this procedure, so that forward film transport takes place. However, if desired, S4 can also be closed so that reverse film transport takes place. The other answer codes are to be used for fetching another type of image, in this case, for example, sub-questions. AND-gates 46, 47, 48 provide the desired code combinations enabling the automatic fetching of sub-question images. For example, if the answers to all questions of an image are "yes", gate 46 supplies a 1-signal. If the answer to the questions I, II and III are "yes", and there is no question IV or the answer to the latter question is "no", gate 47 supplies a 1-signal. If the answer to questions I and II is "yes" and there are no questions III and/or IV, or the answer to this question (questions) is "no", gate 48 supplies a 1-signal.

The foregoing description serves merely as a simple illustration of the many possibilities which exist. Using a plurality of types of question images, a variety of other subdivisions of answer codes are feasible for the fetching of a type.

Figure 6:
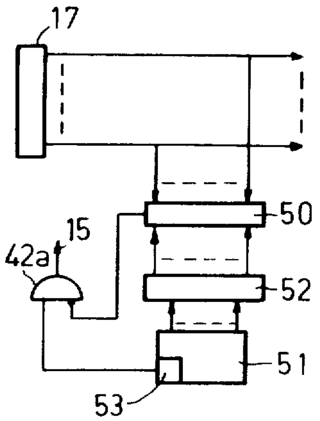
FIG. 6 shows a further extension of the interrogation apparatus.

FIG. 6 shows another interesting feasible extension of the interrogation apparatus. Provided are input means 51 for the input of an image address and address selection means 50 for selecting the image having this address on the record carrier. Using a keyboard as the input means 51, an arbitrary image address can be introduced. This address is converted to the correct code in coding device 52 (for example, form decimal to binary) and is supplied to a comparison unit 50 which serves as the selection means. When the user agrees with an introduced image address, he can operate a switch 53 which activates the fetching process. The AND-gate 42*a* applies a 1-signal to control unit 15 which ensures that the film is transported (see the foregoing description with reference to gate 42). The address codes of the transported images are detected in photocells 17 and are applied to the comparison unit 50. In the case of agreement between the introduced address and a presented address, a 1-signal appears on the output of 50 and the gate 42*a* is blocked. The film transport is then slopped and the desired image is available for projection on the screen 2.

Figure 7:
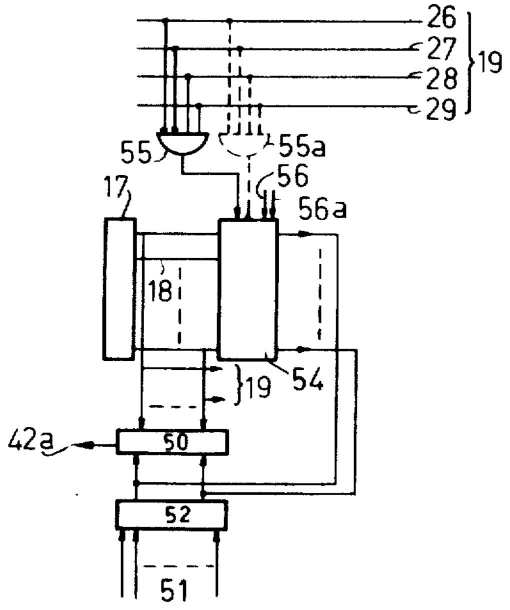
FIG. 7 shows a further extension yet of the interrogation apparatus according to the invention.

FIG. 7 shows how address forming means (54) can be used to generate the address of a new question or group of questions on the basis of an answer to a question.

The following is taken by way of example. Assume that in reaction to an answer "no" to two first questions of a group of questions of an image (or to the absence of the first two questions) and to an answer "yes" to the remainder of the questions, a 1-signal appears on the output of an AND-gate 55. The gate 55*a* which is denoted by broken lines indicates that other combinations are also feasible. Address forming means 54 are provided by means of which the address of the presented image (detected in 17) can be changed. Assume that 54 is an adder by means of which the address, originating from 17 with a given value or values, resulting from the answers to the questions, can be increased. Assume that in this example the 1-signal of gate 55 increases the address value from 17 by a value $x$ which, for example, is already laid down in 54, or which is applied via an input 56 (a 1-signal from 55*a* can increase this address value from 17 by the same or a differnet value (different, for example, from that applied via 56*a*). According to this example, the address value from 17 is applied, together with the answer code present on lines 26 to 29, to the multiplexer 19 (see above).

The new address value formed in the adder 54 can alternatively be applied, together with or without the answer code on lines 26 to 29, to the multiplexer. In any case, the new address value will now be used to select a different image, i.e. the image bearing this address. To this end, the new address is applied to the comparison unit 50. The image having this address is selected on the record carrier in the same way as described wtih reference to FIG. 6.

On the basis of an answer to a question or group of questions, a new question or group of questions is thus automatically presented for projection and answering. The said address formation in 54 can thus result in a new address which identifies an image which is situated at a more remote location of the record carrier. In combination with the case in which such an interrogation apparatus also operates with type indication, this means that not only a next image of a given type can be fetched, but also that an image having an address which is determined at random by answers can also be fetched. This provides a highly flexible use of the interrogation apparatus.

Figure 8:
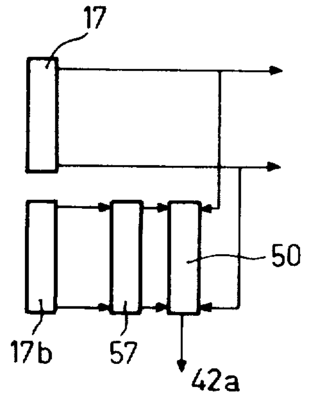
FIG. 8 shows a further feasible aspect yet of the interrogation apparatus.

FIG. 8 illustrates another feasible aspect yet: an image of the record carrier can contain not only the image identifying address, but also an address of an other image. See the address location 8*a* which is denoted by broken lines in FIG. 3. This can be utilized in an interrogation apparatus as follows: an address of an other image is detected in additional address detection means 17*b*. These means 17*b* may be photocells, in which case an adapted, extended light source 17 (see FIG. 4) is used. An address of such an other image is stored in a register 57 and serves as the address of a next image to be selected. This can again be performed in normal manner: the image addresses which are detected in 17 during the transport of the record carrier are applied to the comparison unit 50 which also receives the address from register 57. In the case of agreement, the film transport is stopped (via gate 42*a*, see above) and the desired other image becomes available for projection.

Figure 9:
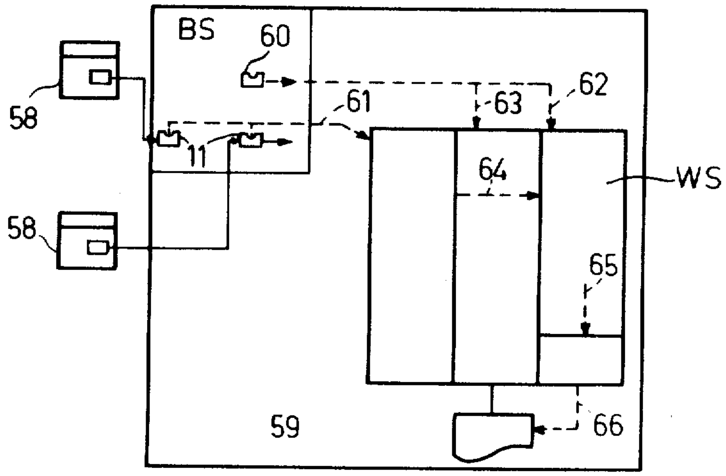
FIG. 9 shows an interrogation system comprising interrogation apparatus according to the invention.

FIG. 9 shows a complete interrogation system comprising off-line interrogation apparatus 58 and a computer system 59, the information flow therein being denoted by broken lines. Cassettes 11 which are filled with interrogation results are introduced into the computer system. Also present is a master cassette 60 in which standard information about the further processing of the interrogation results is stored. This cassette 60 is also introduced into the computer system. This introduction of information is to be understood to mean that the cassettes are actually played back in an input unit of the computer system 59, or that the information is supplied, for example, via a communication network. The information of the cassettes is available in the background store BS of the computer system so, for example, on a tape or also on a disc.

From this background store BS, the answer records (=addresses + answer codes) of cassettes 11 are stored in the computer processing store WS: information flow 61. Part of the standard information of cassette 60 is also stored in the computer processing store: information flow 62. This information will generally contain a thesaurus of words, parts of sentences and sentences. The following also takes place: the address in an answer record corresponds to or refers to an address on the tape of the cassette 60. As associated reference record is present at this address. By means of this address, the relevant reference record of the tape of cassette 60 is selected and is stored in the computer system: information flow 63. The reference record comprises the references between the answers to the questions and the thesaurus. Consequently, the answers in the answer record being processed are referred to the correct locations of the thesaurus via the relevant reference record introduced in the computer processing store; information flow 64. Such a location in the thesaurus is placed, for example, by means of a format program which serves to obtain a proper text lay-out of a report, in a different part of the processing store (information flow 65). The text can be obtained in written form from the processing store by way of an output write procedure: information flow 66. This procedure (information flows 63 to 66) is performed for all answer records which are presented and which relate to the same master cassette 60.

Each type of interrogation procedure will have its own thesaurus and, of course, its own reference records. The address contained in the first answer record will generally also be the first absolute address of a relevant interrogation procedure on the tape of a master cassette 60. The thesaurus of the relevant interrogation procedure can be found by means of this address: the said information flow 62. The said information flows are controlled by means of an introduced control program.

What is claimed is:

1. An off-line interrogation apparatus for use with a record carrier and a recording medium, said carrier having stored thereon image information including questions to be made visible in individual images by said apparatus and having an address location per image on which a machine-readable address has been recorded, said apparatus comprising:
- means for displaying image information in individual images;
- means for detecting the address of an image being displayed;
- operating means for receiving as an input the answers to said questions; and
- means for recording said detected address and said answer on said recording medium.

2. An apparatus according to claim 1 for use with a record carrier which also has stored thereon images which comprise address locations containing addresses of other images, comprising in addition:
- second means for detecting the addresses of other images, and
- address selecting means for selecting said other images.

3. An apparatus according to claim 1 for use with a record carrier which includes a type indication for groups of images, for identifying different types of image information, comprising in addition:
- means for detecting the type indication on the record carrier, and
- means for selecting an image having a type indication on the carrier.

4. An apparatus according to claim 3 comprising means for generating a type indication of a new question or group of questions in response to receipt of at least one answer to a question, and wherein said image selecting means is responsive to said type indication of a new question or group of questions.

5. An apparatus according to claim 1 comprising input means for receiving the address of an image, and means responsive to said address detecting means for selecting on the record carrier the image having said received address.

6. An apparatus according to claim 1, comprising address forming means for generating an address of a new question or group of questions in response to receipt of at least one answer, and address selecting means responsive to said generation of an address for selecting on the record carrier an image to be displayed.

7. An apparatus according to claim 1 for recording random information as an answer to a question associated with an auxiliary apparatus, comprising:

means for receiving an identification code from said auxiliary apparatus, and means for recording said identification code and said random information on said medium as an identifiable combination.

8. An interrogation system comprising:

a computer system having a processor, a store and input and output equipment;

an off-line interrogation apparatus for use with a record carrier and a recording medium, said carrier having stored thereon image information including questions to be made visible in individual images by said apparatus and having an address location per image on which a machine-readable address has been recorded, said apparatus comprising:

means for displaying image information in individual images;

means for detecting the address of an image being displayed;

operating means for receiving as an input the answers to said questions;

means for recording said detected address and said answer on said recording medium; and means for referring to a storage address in the store of the computer system in response to a recorded detected address and answer on said medium, information for further processing of said answer being present at said storage address.

9. A method of storing information by off-line interrogation, using a record carrier on which image information including questions to be made visible in individual images and a machine-readable address at an address location per image have been recorded, comprising the steps of:

displaying said image information in individual images on a screen;

detecting the address of an image being displayed; and recording said detected address and an answer to a question in an individual image on a recording medium.

* * * * *